(12) United States Patent
Sathath (10) Patent No.: US 8,175,524 B2
(45) Date of Patent: May 8, 2012

(54) INFORMATION PROCESSING APPARATUS HAVING A SHARED ANTENNA ELEMENT

(75) Inventor: Anwar Sathath, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 690 days.

(21) Appl. No.: 11/787,465

(22) Filed: Apr. 16, 2007

(65) Prior Publication Data

US 2007/0275660 A1    Nov. 29, 2007

(30) Foreign Application Priority Data

May 29, 2006  (JP) ................................ 2006-148472

(51) Int. Cl.
*H04B 7/14*      (2006.01)

(52) U.S. Cl. ........... 455/19; 455/82; 455/269; 455/13.4; 370/297; 370/302

(58) Field of Classification Search .................. 455/13.4, 455/19, 82, 83, 269, 280; 370/297, 302; 343/702; 333/126
See application file for complete search history.

(56) References Cited

U.S. PATENT DOCUMENTS

| | | | |
|---|---|---|---|
| 6,591,086 B1 | 7/2003 | Pleasant | |
| 2003/0042994 A1* | 3/2003 | Rosenbaum | 333/126 |
| 2003/0080906 A1* | 5/2003 | Miyasaka | 343/702 |
| 2005/0062657 A1* | 3/2005 | Lin | 343/702 |
| 2006/0128333 A1* | 6/2006 | Kenoun et al. | 455/193.2 |
| 2007/0082646 A1* | 4/2007 | Behzad et al. | 455/339 |

FOREIGN PATENT DOCUMENTS

| | | |
|---|---|---|
| JP | 09-321646 | 12/1997 |
| JP | 10-257002 | 9/1998 |
| JP | 11251803 | 9/1999 |
| JP | 2000-031879 | 1/2000 |
| JP | 2000165273 | 6/2000 |
| JP | 2001257511 | 9/2001 |
| JP | 2001292073 | 10/2001 |
| JP | 2002300051 | 10/2002 |
| JP | 2003198408 | 7/2003 |
| JP | 2005-073199 | 3/2005 |
| JP | 2005217909 | 11/2005 |
| WO | WO2004093346 | 10/2004 |

OTHER PUBLICATIONS

Japanese Office Action dated Jun. 10, 2008 for application No. 2006-148472 (U.S. Appl. No. 11/787,465), entitled Information Processing Apparatus. (English Translation).
Chinese Patent Application No. 200710102664.9, The First Office Action, mailed Nov. 27, 2009 (English translation).

* cited by examiner

*Primary Examiner* — Kamran Afshar
*Assistant Examiner* — Marisol Fahnert
(74) *Attorney, Agent, or Firm* — Blakely, Sokoloff, Taylor & Zafman LLP (57) ABSTRACT

According to one embodiment, an information processing apparatus includes an antenna element, a first wireless communication module including a printed circuit board and a wireless communication circuit which is provided on the printed circuit board, and a second wireless communication module. A diplexer is provided on the printed circuit board of the first wireless communication module, and includes a first terminal which is connected to the antenna element via a first antenna connector provided on the printed circuit board and a first cable, a second terminal which is connected to the wireless communication circuit via a wiring pattern on the printed circuit board, and a third terminal which is connected to a second antenna connector provided on the printed circuit board. The second wireless communication module is connected to the second antenna connector via a second cable.

12 Claims, 5 Drawing Sheets

INFORMATION PROCESSING APPARATUS HAVING A SHARED ANTENNA ELEMENT

CROSS-REFERENCE TO RELATED APPLICATIONS

This application is based upon and claims the benefit of priority from Japanese Patent Application No. 2006-148472, filed May 29, 2006, the entire contents of which are incorporated herein by reference.

BACKGROUND

1. Field

The present invention relates to an information processing apparatus such as a personal computer, for example, having a wireless communication function.

2. Description of the Related Art

In recent years, various portable personal computers of a notebook type have been developed. The personal computer of this type includes a wireless communication function for executing wireless communication with an external device.

With recent wide use of various wireless communication schemes, there has begun to be a demand that a plurality of kinds of wireless communication modules, which correspond to a plurality of kinds of wireless communication schemes, be mounted in the portable personal computer.

If dedicated antennas corresponding to the plural kinds of wireless communication modules are provided, a large mounting space would be occupied by the antennas.

In order to share one antenna among the plural kinds of wireless communication modules, it becomes necessary to connect the plural kinds of wireless communication modules to the antenna via a diplexer.

Jpn. Pat. Appln. KOKAI Publication No. 9-321646 discloses a technique in which a plurality of wireless receivers are connected to a diplexer.

In general, in a system using a diplexer, however, an antenna and the diplexer are connected over a cable, and the diplexer and each wireless communication module are also connected via a cable.

For example, in order to realize a system which shares an antenna between two wireless communication modules, it becomes necessary to use a diplexer having three antenna connectors, i.e. first to third antenna connectors, and to mount an antenna connector in each of the two wireless communication modules. A cable which is led out of the antenna is connected to the first antenna connector of the diplexer. The second antenna connector of the diplexer is connected to the antenna connector of one of the wireless communication modules over a cable. The third antenna connector of the diplexer is connected to the antenna connector of the other wireless communication modules over a cable.

At least three antenna connectors are present on the connection path between the antenna and each wireless communication module. For example, the first and second antenna connectors of the diplexer and the antenna connector of one of the wireless communication module are present on the connection path between the antenna and this wireless communication module.

Hence, in the system which uses a diplexer to share an antenna between two wireless communication modules, a great loss and a great return loss occur due to the influence of the three antenna connectors on the connection path. As a result, the quality in wireless communication is degraded.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an information processing apparatus includes: an antenna element; a first wireless communication module including a printed circuit board and a wireless communication circuit which is provided on the printed circuit board; a diplexer provided on the printed circuit board of the first wireless communication module, the diplexer including a first terminal which is connected to the antenna element via a first antenna connector provided on the printed circuit board and a first cable, a second terminal which is connected to the wireless communication circuit via a wiring pattern on the printed circuit board, and a third terminal which is connected to a second antenna connector provided on the printed circuit board, the diplexer bidirectionally connecting the first terminal and the second terminal and also bidirectionally connecting the first terminal and third terminal; and a second wireless communication module which is connected to the second antenna connector via a second cable.

Figure 1:
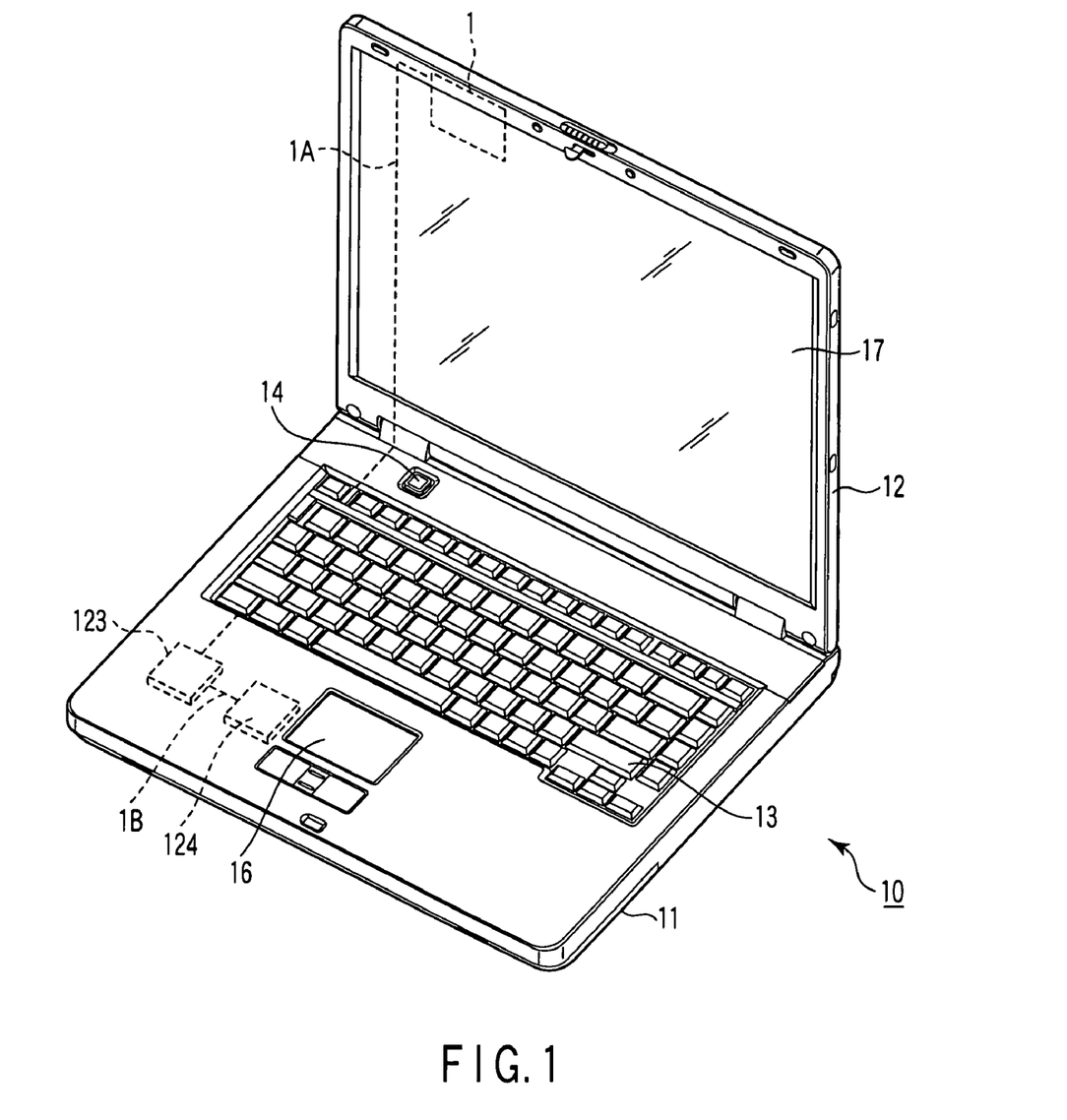
FIG. 1 is an exemplary perspective view showing an external appearance of an information processing apparatus according to an embodiment of the invention.

FIG. 1 shows an external appearance of an information processing apparatus according to the embodiment of the invention. The information processing apparatus is realized, for example, as a battery-powerable portable personal computer 10.

FIG. 1 is a perspective view of the computer 10 in the state in which a display unit of the personal computer 10 is opened. The computer 10 includes a main body (hereinafter referred to as "computer main body") 11 and a display unit 12. A display device that is composed of an LCD (Liquid Crystal Display) 17 is built in the display unit 12. The display screen of the LCD 17 is positioned at an approximately central part of the display unit 12.

The display unit 12 is supported on the computer main body 11 such that the display unit 12 is freely rotatable, relative to the computer main body 11, between an open position in which the top surface of the computer main body 11 is exposed and a closed position in which the top surface of the computer main body 11 is covered.

The computer main body 11 has a thin box-shaped casing. A keyboard 13, a power button 14 for powering on/off the computer 10 and a touch pad 15 are disposed on the top surface of the computer main body 11. Further, a system board (also referred to as "motherboard") on which various electronic parts are disposed, a first wireless communication module 123 and a second wireless communication module 124 are provided in the computer main body 11.

The first wireless communication module 123 is a wireless communication module which executes wireless communication with an external device according to a wireless communication scheme such as UWB (Ultra Wideband). The first wireless communication module 123 is connected to a bus slot which is provided on the system board. In UWB, a frequency band of 3.1 GHz to 4.8 GHz is used. Thus, in the case where the first wireless communication module 123 is realized as a wireless communication module (UWB module) which executes wireless communication according to the UWB standard, the first wireless communication module 123 executes wireless communication by using a wireless signal which falls within a frequency band of 3.1 GHz to 4.8 GHz.

The second wireless communication module 124 is a wireless communication module which executes wireless communication with an external device according to a wireless communication scheme such as Bluetooth™ or Wireless LAN (WLAN). The second wireless communication module 124 is connected to a bus slot which is provided on the system board. In Bluetooth™, a frequency band of 2.4 GHz to 2.5 GHz is used. In the Wireless LAN (WLAN), a frequency band of, e.g. 5.15 GHz to 5.74 GHz is used. In the case where the second wireless communication module 124 is realized as a wireless communication module (BT module) which executes wireless communication according to the Bluetooth™ standard, the second wireless communication module 124 executes wireless communication by using a wireless signal which falls within a frequency band of 2.4 GHz to 2.5 GHz. In the case where the second wireless communication module 124 is realized as a wireless communication module (WLAN module) which executes wireless communication according to the Wireless LAN (WLAN) standard, the second wireless communication module 124 executes wireless communication by using a wireless signal which falls within a frequency band of 5.15 GHz to 5.74 GHz.

The first wireless communication module 123 and second wireless communication module 124 share an antenna element 1. The antenna element 1 is, for example, provided in the display unit 12. The antenna element 1 is connected to the first wireless communication module 123 via a first cable 1A. The position where the antenna element 1 is disposed is, for instance, an upper end portion of the display unit 12. By providing the antenna element 1 in the display unit 12, each of the first wireless communication module 123 and second wireless communication module 124 can execute wireless communication with an external device in the state in which the antenna element 1 is disposed at a relatively high position.

A diplexer is mounted on the first wireless communication module 123. The second wireless communication module 124 is connected to the diplexer on the first wireless communication module 123 via a second cable 1B. The diplexer distributes a signal from the antenna element 1 to the first wireless communication module 123 and second wireless communication module 124. In addition, the diplexer mixes a signal from the first wireless communication module 123 and a signal from the second wireless communication module 124, and sends the mixed signal to the antenna element 1.

The antenna element 1 is composed of a wide-band antenna (also referred to as "multi-band antenna"). The resonance frequency band of the antenna element 1 includes both the frequency band that is used by the first wireless communication module 123 and the frequency band that is used by the second wireless communication module 124.

In the description below, it is assumed that the first wireless communication module 123 is a UWB module and the second wireless communication module 124 is a BT module.

In this case, a transmission power of the first wireless communication module 123 is lower than a transmission power of the second wireless communication module 124.

Specifically, the transmission power of the UWB module is −41.3 dBm. On the other hand, the transmission power of the BT module is 0 dBm or 4 dBm. In this embodiment, it is assumed that the BT module with a transmission power of 0 dBm is used.

In this case, the transmission power of the UWB module is lower than the transmission power of the BT module by 41.3 dB. In other words, the transmission power of the UWB module corresponds to about 1/10000 of the transmission power of the BT module.

Figure 2:
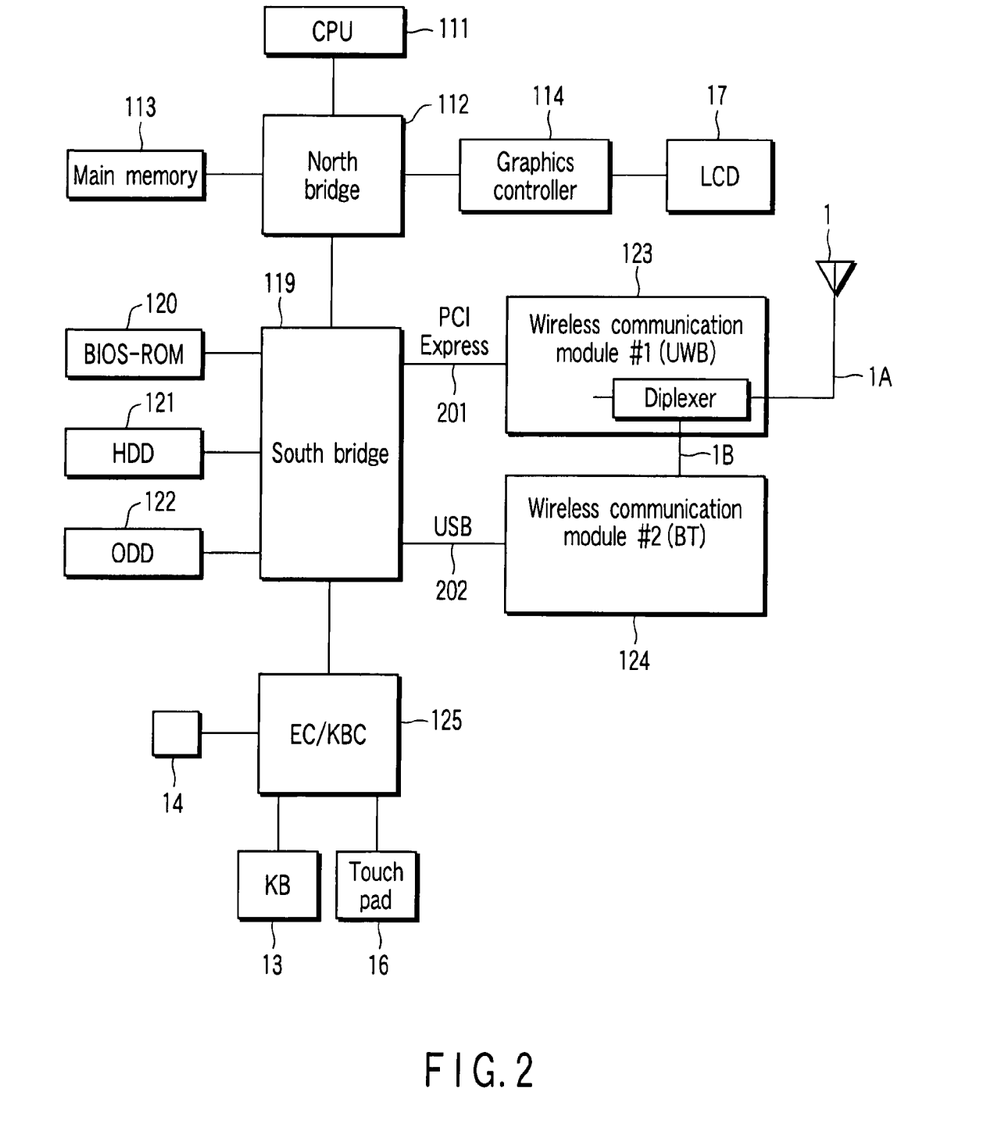
FIG. 2 is an exemplary block diagram showing the system configuration of the information processing apparatus according to the embodiment.

Next, referring to FIG. 2, the system configuration of the computer 10 is described.

The computer 10 comprises a CPU 111, a north bridge 112, a main memory 113, a graphics controller 114, a south bridge 119, a BIOS-ROM 120, a hard disk drive (HDD) 121, an optical disc drive (ODD) 122, first wireless communication module 123, second wireless communication module 124, and an embedded controller/keyboard controller IC (EC/KBC) 125.

The CPU 111 is a processor that controls the operation of the computer 10. The CPU 111 executes an operating system (OS) and various application programs, which are loaded from the HDD 121 into the main memory 113. The CPU 111 also executes a system BIOS (Basic Input/Output System) that is stored in the BIOS-ROM 120. The system BIOS is a program for hardware control.

The north bridge 112 is a bridge device that connects a local bus of the CPU 111 and the south bridge 119. In addition, the north bridge 112 has a function of executing communication with the graphics controller 114 via, e.g. an AGP (Accelerated Graphics Port) bus.

The graphics controller 114 is a display controller which controls the LCD 17 that is used as a display monitor of the computer 10.

The south bridge 119 is a bridge device which controls various I/O devices. The first wireless communication module 123 is connected to the south bridge 119 via a bus 201 such as a PCI Express bus. In addition, the second wireless communication module 124 is connected to the south bridge 119 via a bus 202 such as a USB (Universal Serial Bus).

The embedded controller/keyboard controller IC (EC/KBC) 125 is a 1-chip microcomputer in which an embedded controller for power management and a keyboard controller for controlling the keyboard (KB) 13 and touch pad 16 are integrated.

Figure 3:
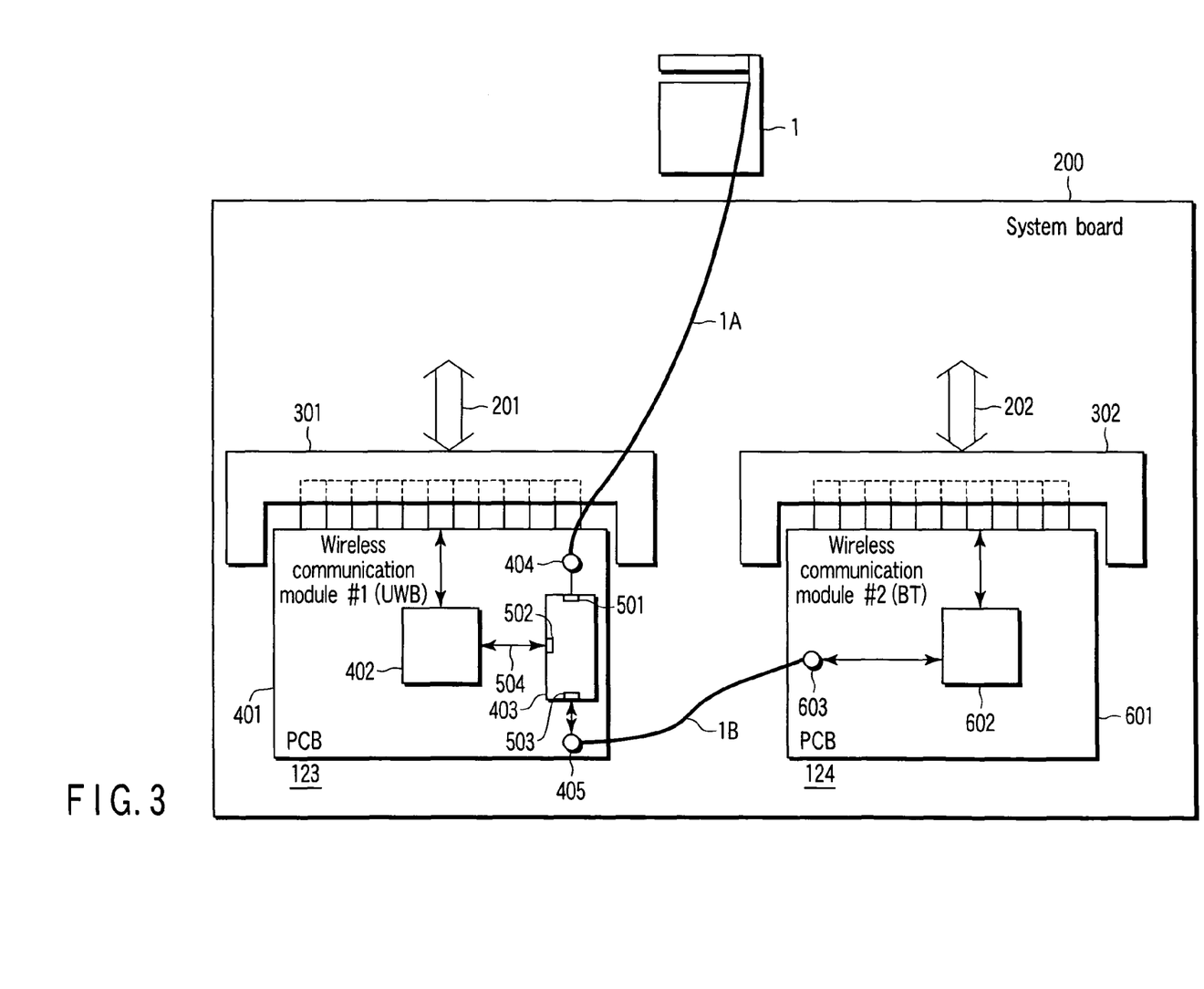
FIG. 3 is an exemplary view for describing the structures of a first wireless communication module and a second wireless communication module, which are provided in the information processing apparatus according to the embodiment.

Next, referring to FIG. 3, the structures of the first wireless communication module 123 and second wireless communication module 124 are described.

The first wireless communication module 123 is composed of an extension card such as a Mini-PCI Express card, and is connected to a bus slot 301 which is provided on the system board 200. The bus slot 301 is connected to the above-mentioned bus 201 which is provided on the system board 200. Various electronic components, such as the above-described CPU 111, north bridge 112, main memory 113, graphics controller 114, south bridge 119, BIOS-ROM 120 and embedded controller/keyboard controller IC (EC/KBC) 125, are mounted on the system board 200.

The first wireless communication module 123 includes a printed circuit board (PCB) 401, a wireless communication circuit 402 which is provided on the printed circuit board (PCB) 401, and the diplexer 403 which is provided on the printed circuit board 401. The wireless communication circuit 402 is an LSI which is configured to execute wireless communication according to the UWB standard. The wireless communication circuit 402 executes communication with a host device (e.g. south bridge 119, CPU 111, etc.) on the system board 200 via a card-edge-type connector of the printed circuit board 401, bus slot 301 and bus 201.

Furthermore, a first antenna connector 404 and a second antenna connector 405 are provided on the printed circuit board (PCB) 401. The first cable 1A, which is led out of the antenna element 1, is connected to the first antenna connector 404. The second antenna connector 405 is connected to the second wireless communication module 124 via the second cable 1B.

The diplexer 403 includes a first terminal 501 which is connected to the antenna element 1 via the first antenna connector 404 and first cable 1A, a second terminal 502 which is connected to the wireless communication circuit 402 via a wiring pattern 504 which is disposed on the printed circuit board 401, and a third terminal 503 which is connected to the second antenna connector 405.

The diplexer 403 bidirectionally connects the first terminal 501 and second terminal 502 and also bidirectionally connects the first terminal 501 and third terminal 503. Specifically, the diplexer 403 has a function of distributing a signal (RF signal) from the antenna element 1 to the first wireless communication module 123 (the wireless communication circuit 402 of the first wireless communication module 123) and second wireless communication module 124, and a function of mixing a signal (RF signal) from the first wireless communication module 123 (the wireless communication circuit 402 of the first wireless communication module 123) and a signal (RF signal) from the second wireless communication module 124, and sending the mixed signal to the antenna element 1.

The signal received by the antenna element 1 is transmitted to the wireless communication circuit 402 of the first wireless communication module 123 via the first cable 1A, first antenna connector 404, first terminal 501 of the diplexer 403, second terminal 502 of the diplexer 403, and wiring pattern 504. Also the signal received by the antenna element 1 is transmitted to the second wireless communication module 124 via the first cable 1A, first antenna connector 404, first terminal 501 of the diplexer 403, third terminal 503 of the diplexer 403, second antenna connector 405, and second cable 1B. The signal outputted from the wireless communication circuit 402 of the first wireless communication module 123 is transmitted to the antenna element 1 via the wiring pattern 504, second terminal 502 of the diplexer 403, first terminal 501 of the diplexer 403, first antenna connector 404 and first cable 1A. The signal outputted from the second wireless communication module 124 is transmitted to the antenna element 1 via the second cable 1B, second antenna connector 405, third terminal 503 of the diplexer 403, first terminal 501 of the diplexer 403, first antenna connector 404 and first cable 1A.

Figure 5:
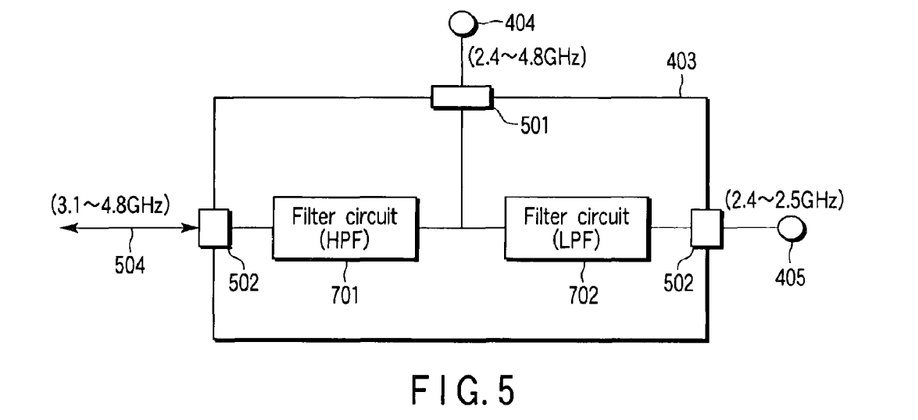
FIG. 5 is an exemplary block diagram showing an example of the structure of a diplexer which is provided in the first wireless communication module 123 shown in FIG. 3.

The diplexer 403, as shown in FIG. 5, includes two filter circuits 701 and 702. The frequency band of the signal, which is transmitted between the antenna element 1 and first terminal 501, is 2.4 GHz to 4.8 GHz. The filter circuit 701 is composed of a high-pass filter (HPF) for passing a signal of a frequency band (3.1 GHz to 4.8 GHz) which is used by the first wireless communication module 123. The filter circuit 702 is composed of a low-pass filter (LPF) for passing a signal of a frequency band (2.4 GHz to 2.5 GHz) which is used by the second wireless communication module 124.

As is shown in FIG. 3, the second wireless communication module 124 is connected to a bus slot 302 which is provided on the system board 200. The bus slot 302 is connected to the above-mentioned bus 202 which is provided on the system board 200.

The second wireless communication module 124 includes a printed circuit board (PCB) 601 and a wireless communication circuit 602 which is provided on the printed circuit board 601. The wireless communication circuit 602 is an LSI which is configured to execute wireless communication according to the Bluetooth™ standard. The wireless communication circuit 602 executes communication with a host device (e.g. a USB controller in the south bridge 119, CPU 111, etc.) on the system board 200 via a card-edge-type connector of the printed circuit board 601, bus slot 302 and bus 202. In addition, the wireless communication circuit 602 is connected to a third antenna connector 603 which is provided on the printed circuit board 601. The third antenna connector 603 is connected to the diplexer 403 of the first wireless communication module 123 via the second cable 1B, as described above. The transmission power of the first wireless communication module 123 is lower than the transmission power of the second wireless communication module 124.

In the structure shown in FIG. 3, the diplexer 403 is mounted on the first wireless communication module 123 with a low transmission power, and the diplexer 403 and wireless communication circuit 402 are connected by the wiring pattern 504. Thus, only the first antenna connector 404 is present as the antenna connector on the connection path between the wireless communication circuit 402 of the first wireless communication module 123 and the antenna element 1. Therefore, the loss and return loss of the signal, which is transmitted between the wireless communication circuit 402 of the first wireless communication module 123 and the antenna element 1, can greatly be reduced.

Figure 4:
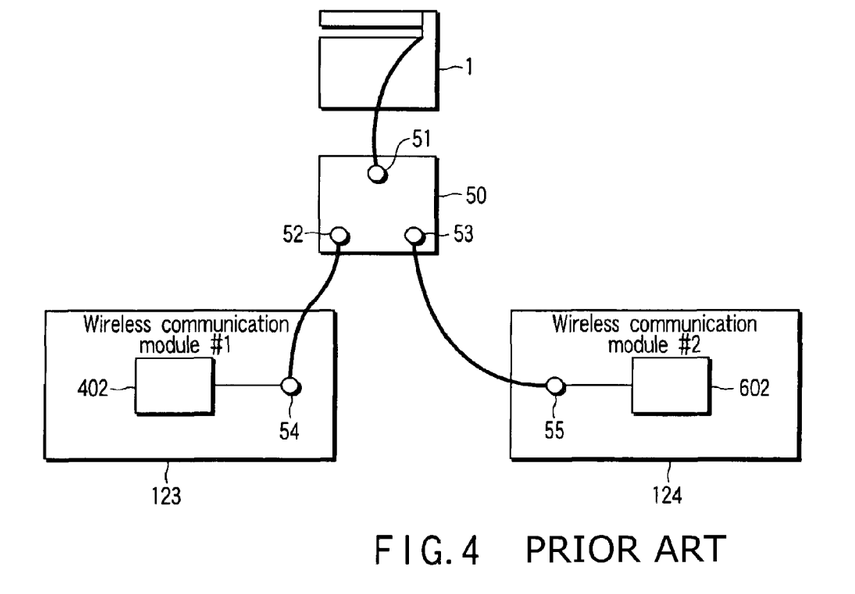
FIG. 4 is an exemplary view for describing a structure in which an antenna is shared by using an ordinary diplexer.

More specifically, as shown in FIG. 4, in the case of adopting the conventional structure in which the antenna element 1 is shared by the first wireless communication module 123 and second wireless communication module 124 with use of the conventional diplexer 50, three antenna connectors 51, 52 and 54 are present on the connection path between the antenna element 1 and the wireless communication circuit 402 of the first wireless communication module 123. Similarly, three antenna connectors 51, 53 and 55 are present on the connection path between the antenna element 1 and the wireless communication circuit 602 of the second wireless communication module 124.

By contrast, in the present embodiment, as described above, only the first antenna connector 404 is present on the connection path between the wireless communication circuit 402 of the first wireless communication module 123 with low transmission power and the antenna element 1. Therefore, the number of connectors on the connection path can be reduced from three to one. Therefore, while the loss of power of the signal from the first wireless communication module 123 can greatly be reduced, the single antenna 1 can be shared by the first wireless communication module 123 and second wireless communication module 124.

Furthermore, in the present embodiment, the first wireless communication module 123 and second wireless communication module 124 are realized as modules independent from the system board 200, and the cable 1A is used for the connection between the first antenna connector 404 and antenna element 1 and the cable 1B is used for the connection between the second antenna connector 405 and third antenna connector 603. Thus, no wiring pattern on the system board 200 is used for the transmission of the RF signal. Therefore, the electronic components on the system board 200 are not adversely affected by the RF signal.

Next, the relationship between the number of antenna connectors and the loss is discussed.

The loss due to one antenna connector is 0.05 dB at minimum. However, the degree of the loss varies depending on the state of connection between the antenna connector and the cable. In some cases, the loss due to one antenna connector may exceed 0.5 dB at maximum. If two antenna connectors are dispensed with, the loss can be reduced by 0.1 dBm at minimum, and by 1 dBm at maximum.

In addition, a return loss occurs at the connection surface of the antenna connector due to impedance mismatching. The increase (actual measured value) of the return loss due to the addition of one antenna connector is shown below.

Figure 6:
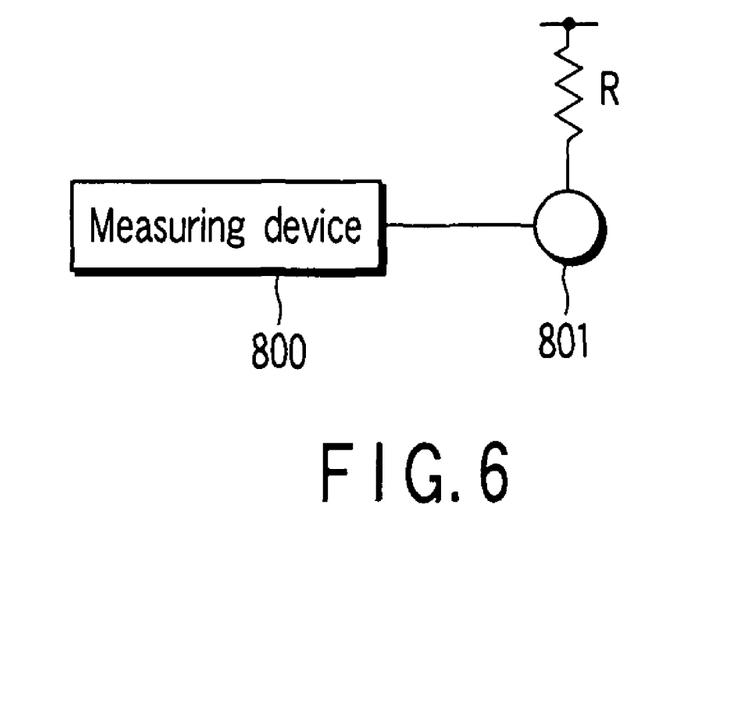
FIG. 6 is an exemplary view for describing an example of the structure for measuring return loss.

(1) A return loss at a time when the number of antenna connectors is one: −39 dB
(2) A return loss at a time when the number of antenna connectors is two: −24 dB The value of (1) is a measurement result in the state in which an antenna connector 801 is connected to a measuring device 800 over a cable, as shown in FIG. 6. The antenna connector 801 is terminated at a resistor R of 50Ω.

Figure 7:
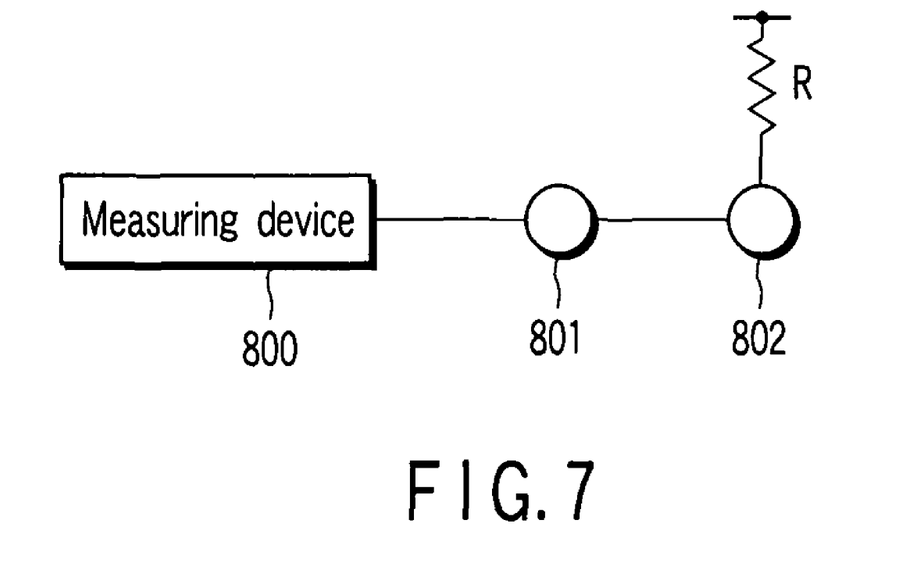
FIG. 7 is an exemplary view for describing another example of the structure for measuring return loss.

The value of (2) is a measurement result in the state in which another antenna connector 802 is connected to the antenna connector 801 over a cable of 5 cm, as shown in FIG. 7. The antenna connector 802 is terminated at a resistor R of 50Ω.

As is clear from the above results, compared to the time when one antenna connector is provided, the return loss increases by even 15 dB. Moreover, since the return loss also varies depending on the state of connection between the connector and cable, the return loss increases as the number of antenna connectors becomes larger.

Since the BT module has a high transmission power, it is hardly adversely affected by the loss or return loss. On the other hand, the UWB module is considerably adversely affected by the loss or return loss since the transmission power of the UWB module is low.

In the present embodiment, as described above, the diplexer 403 is mounted on the first wireless communication module 123 having low transmission power, and the diplexer 403 and wireless communication circuit 402 are connected only by the wiring pattern, without intervention of an antenna connector. With this structure, a decrease in power of a signal, which is transmitted from the first wireless communication module 123, can efficiently be prevented.

In the meantime, a diplexer may also be provided on the second wireless communication module 124, and a third wireless communication module may additionally be connected to the downstream side of the second wireless communication module 124.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
an antenna element shared by a first wireless communication module and a second wireless communication module, (a) the first wireless communication module comprising a first printed circuit board and a wireless communication circuit which is provided on the first printed circuit board, the first wireless communication module being configured to execute wireless communication by using a first wireless communication scheme, (b) the second wireless communication module comprising a second printed circuit board and being configured to execute wireless communication by using a second wireless communication scheme which is different from the first wireless communication scheme, and a transmission power of the first wireless communication module being lower than a transmission power of the second wireless communication module; and
a diplexer provided on the first printed circuit board of the first wireless communication module, the diplexer comprising (i) a first terminal which is connected to the antenna element via a first antenna connector provided on the first printed circuit board and a first cable, (ii) a second terminal which is connected to one end of a wiring pattern on the first printed circuit board, the other end of the wiring pattern on the printed circuit board being connected to the wireless communication circuit, and (iii) a third terminal which is connected to a second antenna connector provided on the first printed circuit board, the diplexer bidirectionally connecting the first terminal and the second terminal and also bidirectionally connecting the first terminal and third terminal,
wherein the second wireless communication module is connected to the second antenna connector via a second cable.

2. The information processing apparatus according to claim 1, wherein the second wireless communication module comprises a third antenna connector which is provided on the second printed circuit board and is connected to the second antenna connector via the second cable, and a wireless communication circuit which is provided on the second printed circuit board and is connected to the third antenna connector.

3. The information processing apparatus according to claim 1, wherein the first wireless communication module is configured to execute wireless communication by a wireless signal which falls within a first frequency band, and the second wireless communication module is configured to execute wireless communication by a wireless signal which falls within a second frequency band, and
a resonance frequency band of the antenna element includes the first frequency band and the second frequency band.

4. The information processing apparatus according to claim 1, further comprising:
a system board;
a plurality of electronic components provided on the system board;
a first bus slot which is connected to a bus provided on the system board; and
a second bus slot which is connected to a bus provided on the system board,
wherein the first wireless communication module is connected to the first bus slot, and the second wireless communication module is connected to the second bus slot.

5. An information processing apparatus comprising:
a main body;
a display unit attached to the main body;
an antenna element provided in the display unit, the antenna element being shared by a first wireless communication module and a second wireless communication module, (a) the first wireless communication module comprising a first printed circuit board and a wireless communication circuit which is provided on the first printed circuit board, the first wireless communication module being configured to execute wireless communication by using a first wireless communication scheme, (b) the second wireless communication module comprising a second printed circuit board and being configured to execute wireless communication by using a second wireless communication scheme which is different from the first wireless communication scheme, and a transmission power of the first wireless communication module being lower than a transmission power of the second wireless communication module; and
a diplexer provided on the first printed circuit board of the first wireless communication module, the diplexer comprising (i) a first terminal which is connected to the antenna element via a first antenna connector provided on the first printed circuit board and a first cable, (ii) a second terminal which is connected to one end of a wiring pattern on the first printed circuit board, the other end of the wiring pattern on the first printed circuit board being connected to the wireless communication circuit, and (iii) a third terminal which is connected to a second antenna connector provided on the first printed circuit board, the diplexer bidirectionally connecting the first terminal and the second terminal and also bidirectionally connecting the first terminal and third terminal,
wherein the second wireless communication module is connected to the second antenna connector via a second cable a second wireless communication module which is provided within the main body and is connected to the second antenna connector via a second cable.

6. The information processing apparatus according to claim 5, wherein the second wireless communication module comprises a third antenna connector which is provided on the second printed circuit board and is connected to the second antenna connector via the second cable, and a wireless communication circuit which is provided on the second printed circuit board and is connected to the third antenna connector.

7. The information processing apparatus according to claim 5, further comprising:
a system board provided within the main body;
a plurality of electronic components provided on the system board;
a first bus slot which is connected to a bus provided on the system board; and
a second bus slot which is connected to a bus provided on the system board,
wherein the first wireless communication module is connected to the first bus slot, and the second wireless communication module is connected to the second bus slot.

8. An information processing apparatus comprising:
an antenna element;
a first wireless communication module electrically coupled to the antenna element via a first cable, the first wireless communication module comprising a first printed circuit board and a wireless communication circuit provided on the first printed circuit board, the first wireless communication module being configured for wireless communications in accordance with a first wireless communication scheme;
a second wireless communication module electrically coupled to the antenna element via a second cable, the second wireless communication module comprising a second printed circuit board and being configured for wireless communications in accordance with a second wireless communication scheme that is different from the first wireless communication scheme, the second wireless communication module having a transmission power that is higher than a transmission power of the first wireless communication module; and
a diplexer provided on the first printed circuit board of the first wireless communication module, the diplexer comprises (i) a first terminal coupled to the antenna element via a first antenna connector provided on the first printed circuit board and the first cable, (ii) a second terminal coupled to one end of a wiring pattern on the first printed circuit board, the other end of the wiring pattern on the first printed circuit board being connected to the wireless communication circuit, and (iii) a third terminal coupled to a second antenna connector provided on the first printed circuit board, the diplexer bi-directionally coupling the first terminal and the second terminal and also bi-directionally connecting the first terminal and third terminal.

9. The information processing apparatus according to claim 8, wherein the second wireless communication module comprises a third antenna connector provided on the second printed circuit board and is coupled to the second antenna connector via the second cable, and a wireless communication circuit which is provided on the second printed circuit board and is connected to the third antenna connector.

10. The information processing apparatus according to claim 8, wherein the first wireless communication module is configured for wireless communications by wireless signals falling within a first frequency band, and the second wireless communication module is configured for wireless communications by wireless signals falling within a second frequency band.

11. The information processing apparatus according to claim 10, wherein a resonance frequency band of the antenna element includes the first frequency band and the second frequency band.

12. The information processing apparatus according to claim 8, further comprising:
a system board;
a plurality of electronic components provided on the system board;
a first bus slot coupled to a bus provided on the system board; and
a second bus slot coupled to a bus provided on the system board,
wherein the first wireless communication module is coupled to the first bus slot, and the second wireless communication module is coupled to the second bus slot.

* * * * *